2,638,407

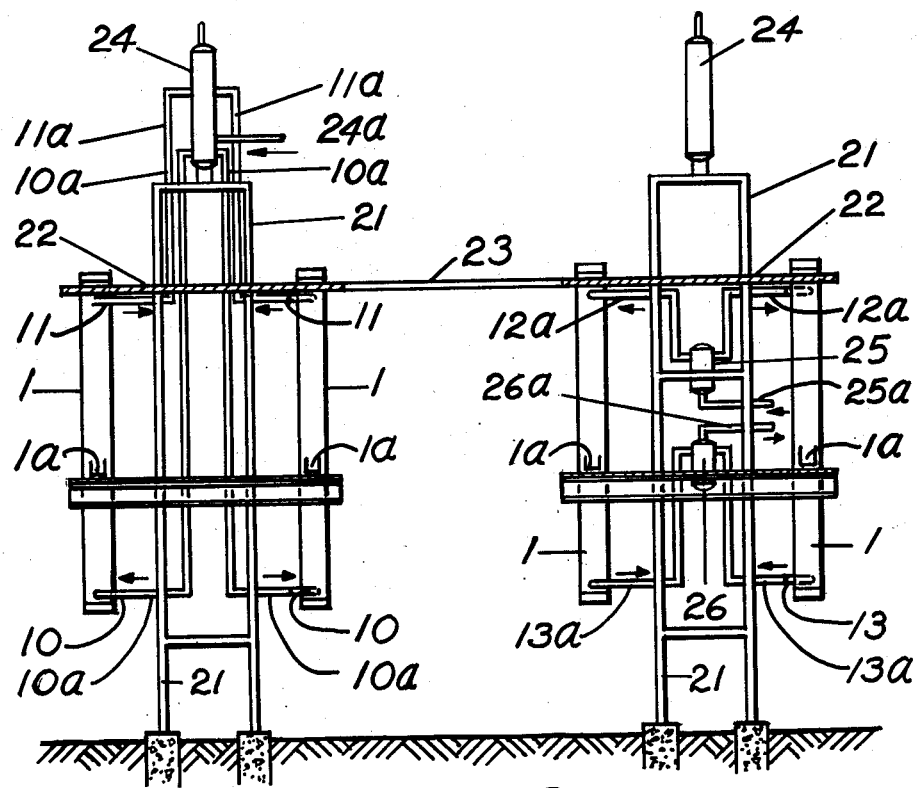
Fig. —3
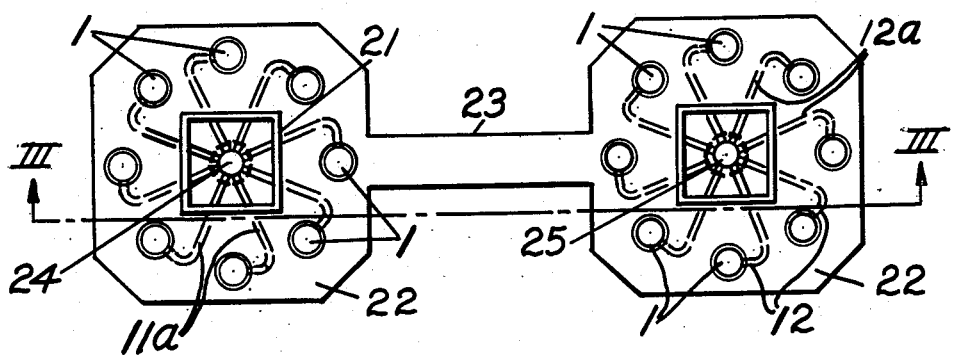
Fig. —2
Asa B. Steeves Inventor
By W. O. Heilman Attorney Asa B. Steeves Inventor
By W. V. Hilman Attorney Patented May 12, 1953

UNITED STATES PATENT OFFICE 2,638,407

APPARATUS FOR CLOSE TEMPERATURE CONTROL OF CATALYZED GAS REACTIONS

Asa B. Steeves, Metuchen, N. J., assignor to Standard Oil Development Company, a corporation of Delaware Application December 31, 1949, Serial No. 136,279

2 Claims. (Cl. 23—288)

The present invention relates to a method and apparatus for contacting fluid reactant materials and particularly gaseous reactant materials with a fixed bed solid catalyst therefor. More particularly, the invention relates to a method and apparatus adapted to improve the efficiency of endothermic and exothermic reactions in the presence of catalytic materials.

Prior to the present invention, the methods and apparatus which have been employed for large-scale operations have been merely extensions of similar methods and apparatus employed for smaller scale operations. It has not been recognized that the efficiency of operation is in any way affected by simply increasing the size of dimensions of apparatus employed in a small-scale operation in order to adapt it to operations on a larger scale. The apparatus employed previously merely has been expanded to accommodate larger volumes of catalyst and greater throughput of the gaseous reactant materials without regard to the effect of such expansion upon uniformity of reaction temperatures, or the necessity for symmetry in disposition of the reaction chambers and communicating conduit connections. As a result, reactions which have been carried out with complete success as experimental or small-scale operations, have failed to produce the desired results when adapted to large-scale or commercial practice.

According to the present invention, there is provided a method and apparatus in which a given reaction may be carried out with uniformity of results and maximum efficiency regardless of the magnitude of the operation involved. In addition to the accomplishment of this object, other advantages are obtained including economy in construction cost obtained by the employment of uniform apparatus elements, and by permitting increase or reduction in capacity of a given plant without complete replacement of the apparatus elements required for the process. Furthermore, due to the improved reaction efficiency obtained according to the present invention, and more uniform control of reaction temperatures in the process, economy is also obtained by extension of the effective life of the catalysts which may be employed.

The invention and its objects may be more fully understood from the following specification when read in conjunction with the accompanying drawings, in which:

Fig. 2 is a plan view of a typical apparatus installation in which the left-hand portion shows the arrangement of typical heat exchange conduit connections, and the right-hand portion typical feed or discharge connections for reactant materials, all in semi-diagrammatic form;

Figure 4:
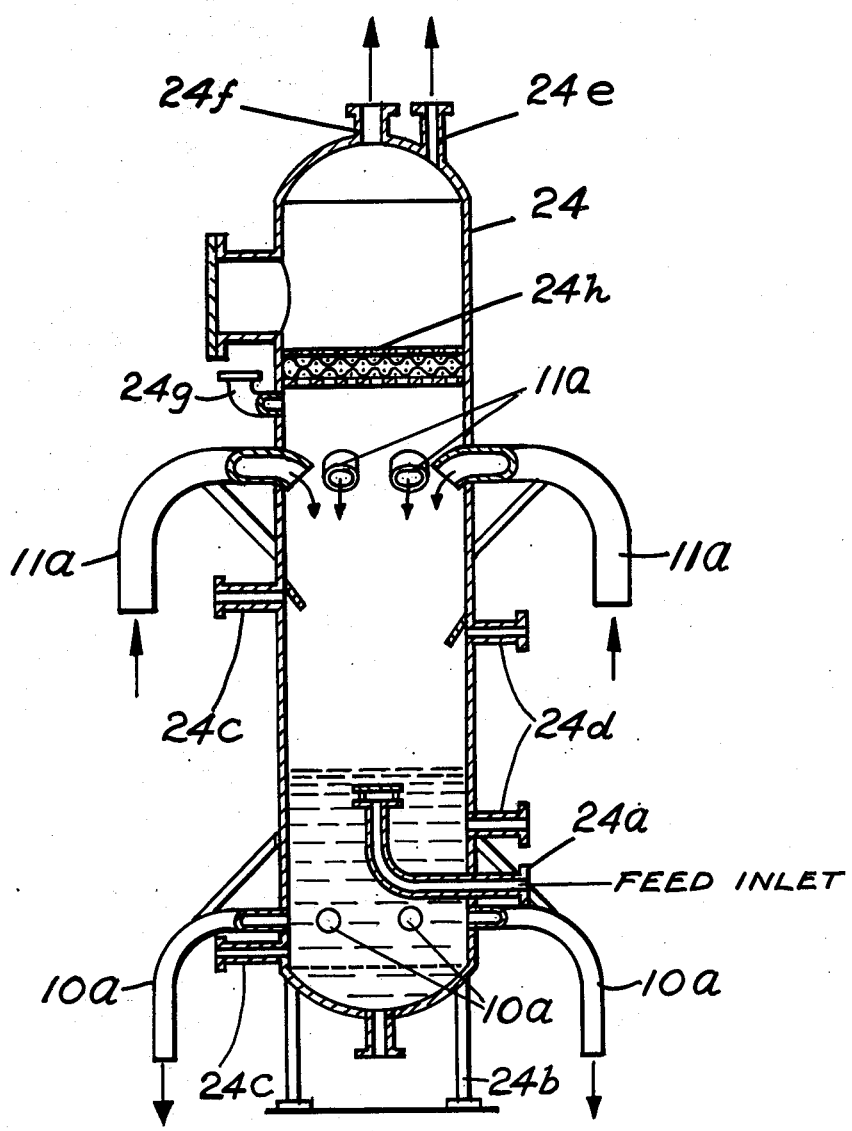

Fig. 3 is a side elevational view along the line III—III of Fig. 2, in semi-diagrammatic form, and showing only those portions of the apparatus required to illustrate the relative location and disposition of typical apparatus elements and the conduit connections thereto, the right- and left-hand portions of the figure corresponding to the right- and left-hand portions of Fig. 2; and Fig. 4 is a vertical section through a heat exchange fluid reservoir employed in the manner contemplated according to the present invention.

Figure 1:
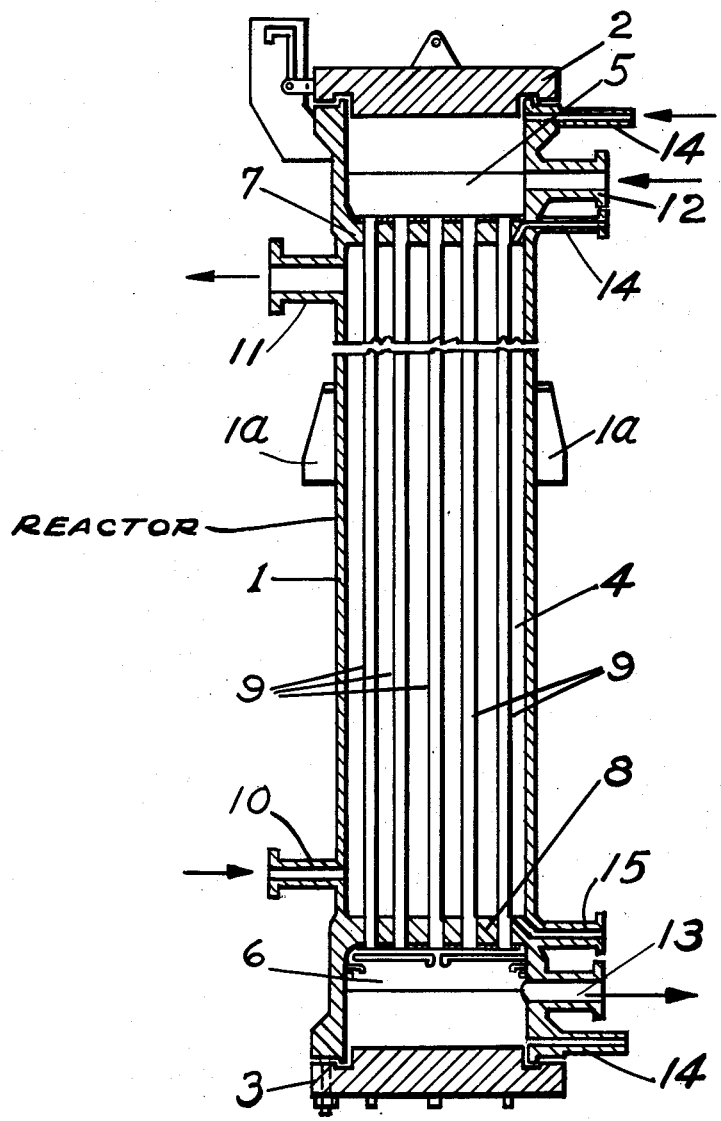
Fig. 1 is a vertical section through a generally conventional reactor of the character contemplated for use according to the present invention.

Referring more particularly to the drawings, in the illustration of a reactor vessel according to Fig. 1, the numeral 1 designates the vessel shell having a head portion 2 closing the upper open end of the vessel and a head portion 3, the lower end. Interiorly, the vessel 1 is divided into a heat exchange chamber 4 disposed between header chambers 5 and 6 and separated therefrom by means of lateral partitions 7 and 8. Communicating between the header chambers 5 and 6 longitudinally of the vessel are a plurality of substantially identical, elongated, tubular reactor elements 9 extended through the heat exchange chamber in symmetrically disposed spaced parallel relation. Preferably, each of these elements is limited to an interior diameter of not more than about 2.1 inches, or a cross sectional area of about 3.5 square inches, and the number of tubes in each such reactor vessel is restricted so that the total cross sectional area of all of said elements in each vessel is not substantially more than 270 square inches. In the vessel illustrated, a heat exchange liquid may be admitted to the chamber 4 by way of an inlet 10 circulated through the chamber and removed by way of outlet 11. Gaseous reactant materials are preferably passed through the reaction chamber in countercurrent relation to the flow of heat exchange fluid through the vessel, entering as by way of inlet 12 into the header chamber 5, passing therefrom downwardly through the reactor elements 9 into the header chamber 6, and passing out of the vessel as by way of the outlet 13. Various other conventional conduit connections such as vents 14 or a blow-down connection 15 for the heat exchange chamber 4 may be provided. In the apparatus as illustrated, the vessel 1 is provided with mounting lugs 1a.

In Fig. 2 is illustrated the symmetrical arrangement of a plurality of reaction vessels conventionally supported by means of towers 21 and provided with platform structures 22 surrounding the towers and the reaction vessels 1 at the upper end of said vessels. The respective platforms, as shown, may be connected as by means of a walkway 23. In the left-hand portion of the drawing, the typical arrangement and relationship of conduit connections 11a communicating with the outlet 11 from the reaction vessel 1 to a reservoir 24 for heat exchange fluid is illustrated. Similar connections from the reservoir 24 to the inlet 10 of the vessel 1 are provided and arranged in equally symmetrical fashion. In the right-hand portion of Fig. 2, the inlet connections 12a from a reservoir 25 for gaseous reactant materials is similarly illustrated to show the comparable symmetrical arrangement of such connections.

In the illustration of the apparatus according to Fig. 3, only two reaction vessels are illustrated, in each of the right and left-hand portions of the figure, with their respective connections to the heat exchange and gaseous reactant reservoirs being separately shown in the left and right-hand portions of the figure. In the right-hand portion of this figure is also shown a receiver 26 for reactant gaseous materials discharged through the outlet 13 into the receiver by way of conduit connections 13a. The conduit connections 13a are disposed in symmetrical fashion as are the connections 12a or 11a. In each instance, these connections are disposed and arranged so as to be of equal length from their connection to any given reservoir or receiver element and the several reactor vessels. To accomplish this, the reactor elements are disposed in arcuately spaced relation one to another equidistant radially from a common center, with the tower support and the respective reservoir and receiver elements disposed in a vertical line concentric therewith. The reservoir 25 and the receiver 26 are respectively provided with inlet and outlet conduit connections 25a and 26a, while the heat exchange reservoir 24 is supplied by way of an inlet or feed conduit 24a. Circulation through the reservoir 24 to and from the several reactor vessels is accomplished by way of inlet and outlet conduit connections 102 and 11a.

To simplify the drawings, in each of the Figs. 2 and 3, the reservoir and receiver elements for reactant materials and their conduit connections have been omitted from the left-hand portion of each figure; in Fig. 2, the reservoir 24 for heat exchange liquid has been omitted from the right-hand portion of the figure, and in Fig. 3, conduit connections between the reservoir 24 and vessels 1 have been omitted from the right-hand portion. It is to be understood, however, that each right and left-hand portion as shown in these figures actually will be a complete unit, including a series of arcuately spaced vessels 1, and a supporting structure 21, as well as the reservoirs and receivers carried thereby, disposed concentrically of the vessel arrangement, with each reservoir and receiver communicating with each of the vessels by conduits 10a, 11a, 12a and 13a in the manner previously described.

For the purpose of better illustrating the circulation of heat exchange fluid through the reservoir 24, a typical structure is illustrated in Fig. 4. As shown, the reservoir 24 is provided with suitable supporting structure 24b adapted for mounting of the reservoir on the tower 21. The feed line 24a enters the vessel through a lower portion thereof opening upwardly at an intermediate level therein. Outlet connections from the reservoir are provided by means of the line 10a opening from the lower end of the vessel. The conduit connections 10a communicate with the inlet 10 of the vessel 1 open from the lower portion of the reservoir 24 as shown below the normal level of a heat exchange fluid therein, while the connections 11a each communicating with an outlet 11 from a vessel 1, open into the reservoir 24 at an intermediate level therein above the level of heat exchange fluid. The reservoir 24 is also provided with miscellaneous conventional connections and equipment such as gauge glass connections 24c, level control connections 24d, a vent 24e, an outlet 24f, safety valve 24g, and an entrainment separator means 24h.

In operation, the head members 2 of the reactor vessels 1 are removed and a suitable catalyst material in granular form, or as lumps or pellets of such material, is loaded into the reaction elements 9 by way of the chamber 5 and the head 2 reattached to the vessel 1. For the purpose of this description, the catalyst material may be considered as a granular-type catalyst, whether particles of a crushed solid catalyst, or formed as pellets. Normally the individual particles will be in the range of from about $\frac{3}{16}''$ x $\frac{1}{4}''$ to about $\frac{1}{2}''$ x $\frac{3}{4}''$. A gaseous reactant material is then passed through the ssytem by way of conduit 25a, reservoir 25, conduit connections 12a, the tubular reaction elements 9, and is withdrawn from the reaction zones by way of conduit connections 13a into a receiver drum 26 and thence withdrawn by way of conduit 26a. During this operation, a heat exchange fluid supplied to the receiver 24 by way of the inlet and conduit connection 24a is circulated through the heat exchange chamber 4 by way of conduit connections 10a, connected to the inlet 10 of each vessel 1, and withdrawn from the heat exchange chamber through the outlets 11, connected to the reservoir 24 by way of conduit connections 11a opening into the reservoir. Circulation of the heat exchange fluid is preferably accomplished thermo-syphonically in an exothermic reaction, the fluid such as water in the heat exchange chamber 4 being heated to the boiling point causing a portion thereof to evaporate forming steam and lowering the density of the water in the chamber as compared with that remaining in the lines 10a and the reservoir 24. By this means a continuous circulation of the heat exchange fluid is established and cooling of the tubular reaction elements 9 is accomplished. By limiting the number of elements 9 in a given reactor vessel, more uniform distribution and flow of the reactant gaseous materials is obtained. By limiting the area and volume of the individual reactor elements, and the total area of all reactor elements in a given reactor vessel, more uniform heat exchange characteristics are obtained for the operation. By symmetrical arrangement of the reactor vessels 1 with relation to the means for circulating gaseous reactant materials and heat exchange fluid therethrough, uniformity of flow through the various conduit connections is accomplished so as to obtain substantially uniform final reaction products from each reaction element or reactor vessel, and in general avoid localized conditions in any element or vessel interfering with optimum efficiency of operating conditions.

The apparatus and method of operation described is applicable to a variety of processes, including the synthesis of hydrocarbon materials from carbon monoxide and hydrogen in the presence of iron or cobalt catalyst materials, hydrogenation, such as the hydrogenation of iso-octene to iso-octane, employing a nickel catalyst, and the catalytic polymerization of olefin hydrocarbons. As an example of the latter, the apparatus described may be charged with a catalyst such as phosphoric acid impregnated on kieselguhr clay, extruded or otherwise handled to produce the pelletized form desired. Such catalyst material may contain about 60% of $P_2O_5$ and 8% of water by weight. Reactant gases, such as a mixture of hydrocarbon gases containing from about 35% to about 40% polymerizable materials in the nature of from $C_2$ to $C_5$ olefin hydrocarbons may be passed through the charged reactors while held under pressures in the range of from about 250 to about 2000 p. s. i. g. to be polymerized, circulation of a heat exchange fluid, such as water, being maintained so as to obtain reaction temperatures in the range of from about 300° to about 500° F. When employed in the manner described, polymer recovery may be as high as 150 gallons of liquid polymer per pound of catalyst employed, or even higher.

The primary advantages obtained by the invention are in increased catalyst life and higher production of the desired products. By increasing catalyst life and reducing unequal deterioration thereof through the system, the apparatus may be maintained on stream for longer periods, reducing the frequency of cleaning and recharging periods, thereby avoiding excessive production costs.

What is claimed is:

1. An apparatus for contacting fluid reactant materials with a fixed bed solid catalyst therefor, comprising a plurality of vertical reactor vessels of substantially equal volume symmetrically disposed in arcuately spaced relation one to another, equidistant radially from a common center, a heat exchange chamber in each vessel, a plurality of substantially identical, elongated, tubular reactor elements equally distributed among said vessels, symmetrically disposed in spaced parallel relation interiorly of each vessel, extending vertically through the heat exchange chamber therein, said elements in communication above and below said chamber, a common reservoir vessel for a heat exchange fluid, a common reservoir vessel for a fluid reactant material, and a common receiver vessel for said material after passage through said reaction elements, all disposed in a vertical line through said center point, and conduit connections between said reservoir and receiver vessels, and the reactor vessels, said connections being of substantially identical length and nature between the respective reactor vessels and any one of said reservoir or receiver vessels.

2. An apparatus according to claim 1, in which the cross sectional area of each reactor element is not substantially more than 3.5 square inches, and the total cross sectional area of all said elements in each reactor vessel is not substantially more than 270 square inches.

ASA B. STEEVES.

References Cited in the file of this patent

UNITED STATES PATENTS

| Number | Name | Date |
|---|---|---|
| 2,173,984 | Shapleigh | Sept. 26, 1939 |
| 2,231,493 | Cummings | Feb. 11, 1941 |
| 2,240,481 | Aicher | May 6, 1941 |
| 2,266,095 | Thayer | Dec. 16, 1941 |
| 2,391,315 | Hulsberg | Dec. 18, 1945 |

FOREIGN PATENTS

| Number | Country | Date |
|---|---|---|
| 285,668 | Great Britain | Feb. 23, 1928 |